United States Patent

[11] 3,618,719

| [72] | Inventors | Joseph A. Marland<br>Hinsdale;<br>Charles W. Hill, La Grange, both of Ill. |
|---|---|---|
| [21] | Appl. No. | 5,216 |
| [22] | Filed | Jan. 23, 1970 |
| [45] | Patented | Nov. 9, 1971 |
| [73] | Assignee | Marland One-Way Clutch Corporation<br>La Grange, Ill. |

[54] DUAL ENGINE DRIVE FOR MARINE PROPELLER SHAFT
4 Claims, 7 Drawing Figs.

[52] U.S. Cl. ................................................ 192/4 R,
192/12 B, 192/12 C, 192/45, 192/48.6, 192/55,
192/113 B, 192/86, 74/661
[51] Int. Cl. ............................................. F16h 57/10
[50] Field of Search ................................. 192/4, 4 C,
.098, 12 C; 74/661

[56] References Cited
UNITED STATES PATENTS

| 2,741,137 | 4/1956 | Hindmarch | 192/4 C X |
| 2,741,351 | 4/1956 | Fletcher et al. | 192/4 |
| 2,826,096 | 3/1958 | Hodge | 74/661 |
| 2,826,255 | 3/1958 | Peterson | 192/12 C X |
| 3,003,606 | 10/1961 | Hindmarch | 192/4 C |

*Primary Examiner*—Benjamin W. Wyche
*Attorney*—Burmeister, Palmatier & Hamby

ABSTRACT: A marine propulsion transmission for driving a propeller in a forward direction by a main engine and an auxiliary engine working either individually or in unison and for driving the propeller in reverse by the main engine without reversing the auxiliary engine. The propeller is driven forwardly by the main engine through a one-way clutch allowing overdriving of the propeller by the auxiliary engine and integrated in parallel with a cushioned positive clutch through which the main engine drives the propeller in reverse. The propeller is also driven forwardly by the auxiliary engine through a one-way clutch allowing overdriving of the propeller by the main engine and integrated in tandem with a positive clutch. Integrated electrical and hydraulic controls provide for alternate engagement of the positive clutches to assure disengagement of the auxiliary engine when the propeller is driven in reverse. A brake operated automatically by the same controls briefly stops a freewheeling drive element between the tandem clutches before the corresponding positive clutch is engaged. Working parts are lubricated by jets of fluid under pressure from the hydraulic control system directed into the ends of mutually concentric components.

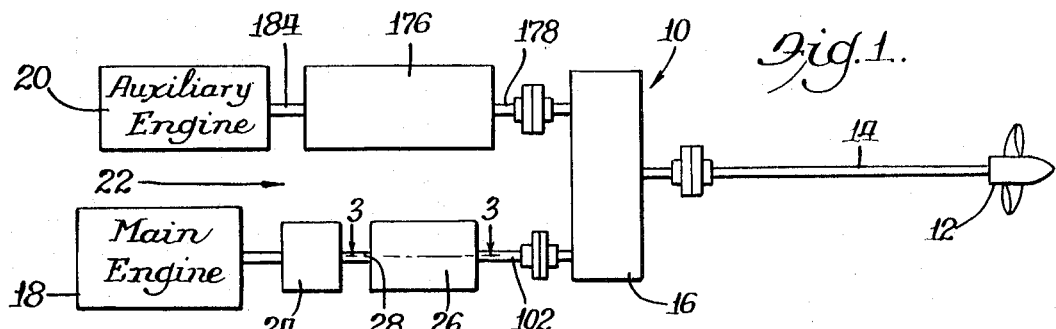
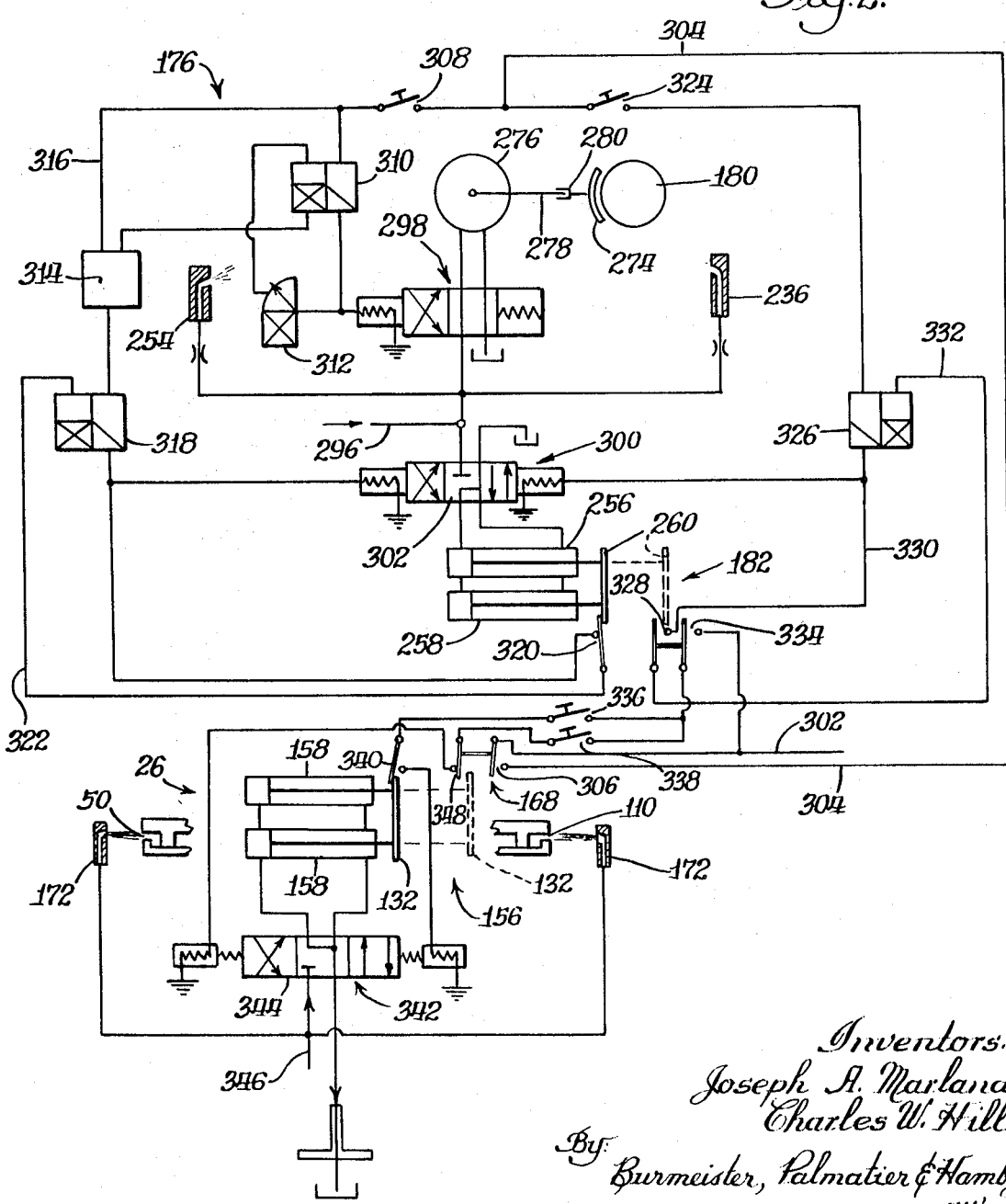

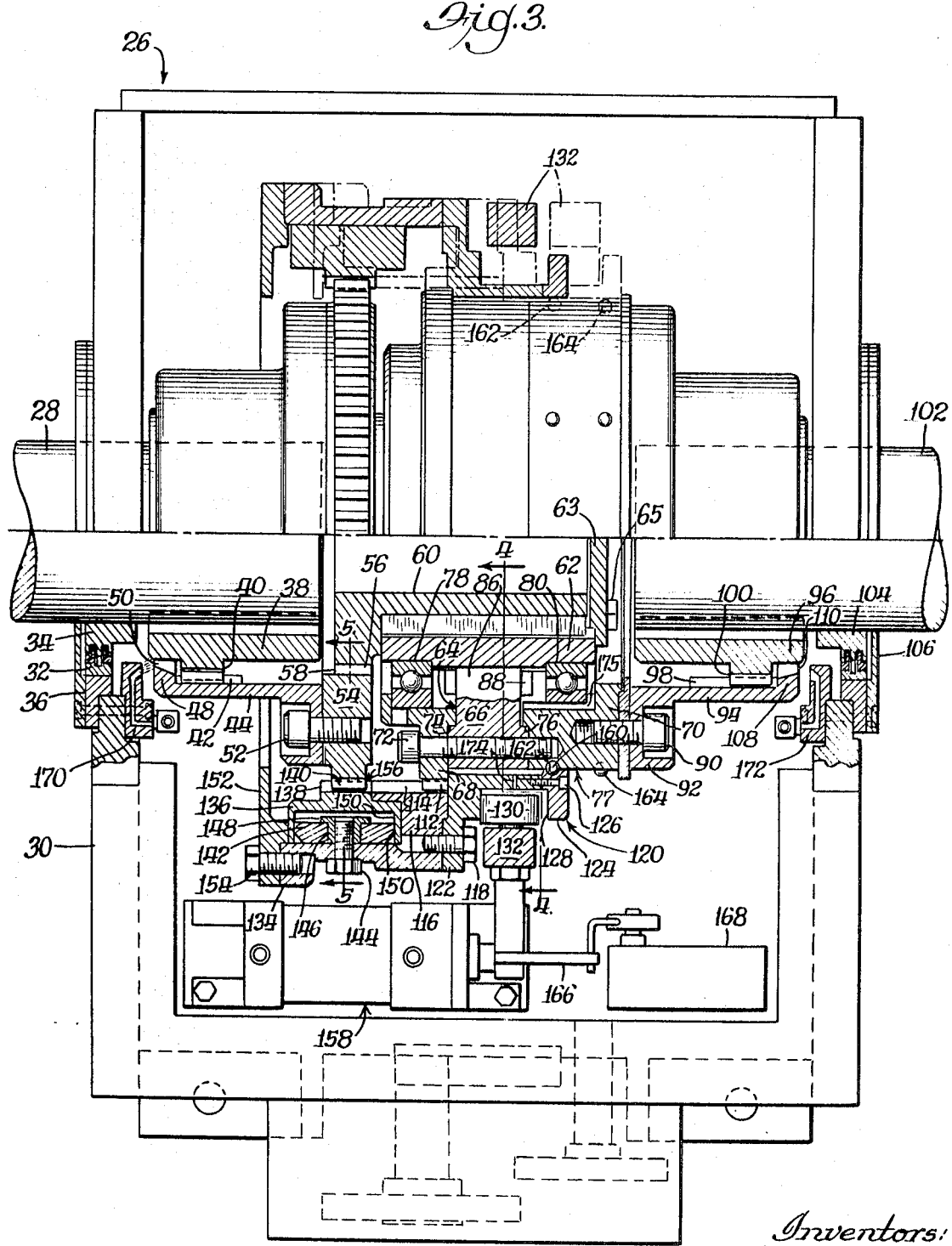

PATENTED NOV 9 1971

Inventors:
Joseph A. Marland
Charles W. Hill

By: Burmeister, Palmatier & Hamby
Attys.

DUAL ENGINE DRIVE FOR MARINE PROPELLER SHAFT

This invention is concerned with mechanical power transmissions and relates particularly to a marine propulsion system having a reversible propeller shaft powered by a main engine and an auxiliary engine.

One object of the invention is to provide a new and improved power transmission, particularly a marine propulsion system, in which a drive shaft is driven reversibly by a main engine and is driven forwardly by either the main engine or an auxiliary engine or both in such manner that either engine can assume automatically the full load of turning the shaft in a forward direction.

Another object is to provide for rotating a reversible power shaft, a new and improved drive which automatically transmits driving power from either or both of two engines to the drive shaft for rotating the latter in a forward direction while continuously allowing either engine to assume the full driving load without suffering any significant drag from the other engine, one engine being rendered capable of driving the shaft in the reverse direction without any reversal of the other engine.

A further object is to provide for driving a power shaft reversibly a new and improved transmission in which a main engine is connected to drive the shaft forwardly through a first compact clutch unit incorporating a one-way clutch in parallel with a positive clutch and in which an auxiliary engine is connected to drive the same shaft forwardly through a clutch unit incorporating a one-way clutch in tandem with a positive clutch, the two positive clutches being interrelated so that such clutches are engaged alternately to the end that both said engines can be rendered continuously effective either cumulatively or alternately to turn the shaft in the forward direction or the main engine can be rendered effective to turn the drive shaft in the reverse direction as well as the forward direction without any reversal of the auxiliary engine and without any drag being imposed from the auxiliary engine.

A further object is to provide a power transmission of the above character having a new and improved construction which effectively avoids shock loads and clashing of positively engaged torque elements as an incident to engagement of either positive clutch.

Another object is to provide a transmission unit of the character recited which is controlled reliably to advantage by mutually integrated electrical and hydraulic circuits which effect mutually coordinated operation of the positive clutches in alternate relation to each other.

Another object is to provide an improved transmission of the character described which connects an output shaft with an auxiliary engine by means of a one-way clutch allowing overdriving of the output shaft by a main engine and being driven by a positive clutch operating in tandem with the one-way clutch and providing for disengagement of the auxiliary engine for reversal of the output shaft by the main engine, the driving relation of the auxiliary engine to the output shaft being reestablished by engagement of the positive clutch that is effected without shock or clashing of parts by virtue of a momentary stopping of a freewheeling torque-transmitting element intervening between the two clutches.

A related object is to provide an improved transmission of the character recited which connects an output shaft with a main engine by means of a one-way clutch allowing overdriving of the output shaft by an auxiliary engine and being structurally integrated in parallel with a positive clutch in a compact unit so that the output shaft can be driven in reverse by the main engine upon selective engagement of the positive clutch that is effected without shock or clashing of parts.

A further object is to provide a transmission of the character recited formed of highly compact, coordinated clutch units of large torque-carrying capacity and being inherently well suited for economical manufacture and capable of operating reliably over a long service life.

Other objects and advantages will appear from the following description of the exemplary embodiment of the invention illustrated in the drawings, in which:

FIG. 1 is a schematic illustration of a marine propulsion system incorporating the invention and utilizing a main engine and an auxiliary engine to drive a single propeller;

FIG. 2 is a diagrammatic illustration of integrated electrical and hydraulic control circuits incorporated in the transmission;

FIG. 3 is a partially sectioned longitudinal view, taken with general reference to the line 3—3 of FIG. 1, of the drive between the main engine and speed-reduction gearing;

Figure 4:
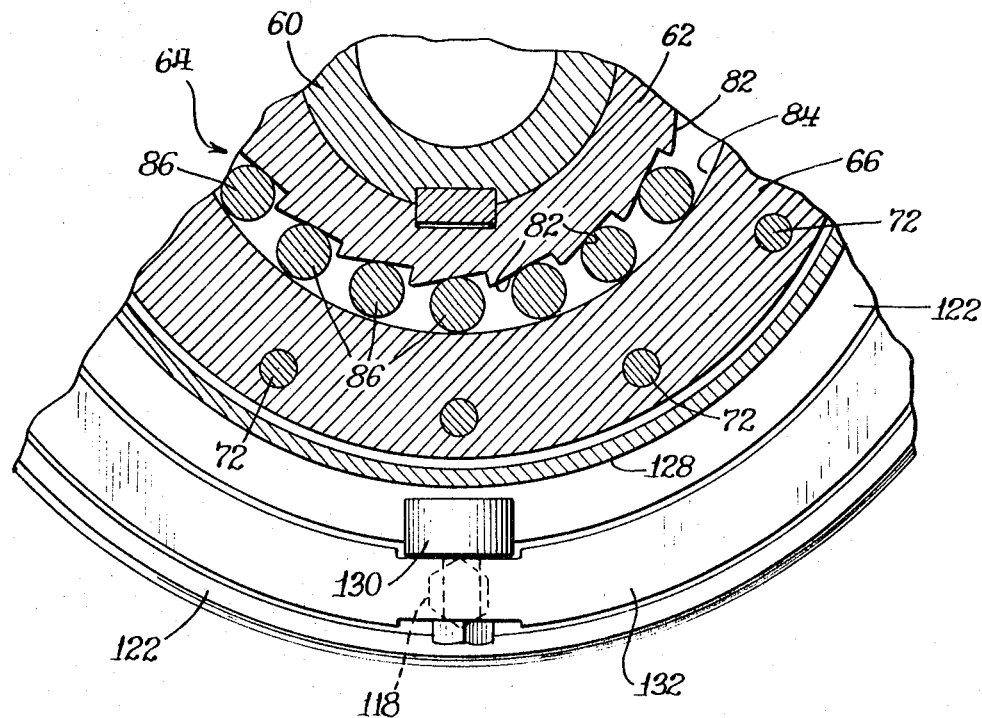
FIG. 4 is a fragmentary sectional view on an enlarged scale taken with reference to the line 4—4 of FIG. 3.

Referring in greater detail to the drawings, the marine propulsion system 10 incorporating the illustrated embodiment of the invention comprises, as shown, a single propeller 12 rotated by a shaft 14 connected to speed-reduction gearing 16 and energized by a main engine 18 and an auxiliary engine 20. The transmission used to connect the main engine 18 and the auxiliary engine 20 through the speed-reduction gearing 16 to the shaft 14 is denoted generally in FIG. 1 by the number 22.

The main engine 18 functions not only to energize rotation of the shaft 14 in the forward direction in the manner to be described, but also powers rotation of the propeller shaft in the opposite direction, in each instance without suffering drag from the auxiliary engine 20.

For purposes of illustration, the main engine 18 may be assumed to be a diesel engine which rotates in only one direction and in this instance the main engine is connected through a suitable reversing gear assembly 24, illustrated schematically in FIG. 1, with a compact unit 26 of the transmission 22 illustrated in detail in FIG. 3 and connected to the speed-reduction gearing 16, FIG. 1.

As shown in FIG. 3, an output shaft 28 of the reversing gear assembly 24 forms an input drive shaft into the transmission unit 26 and extends into a housing 30 for the unit 26 through an oil seal 32. In this instance, the oil seal 32 is a labyrinth seal provided by an annular collar 34 fitted around the shaft 28 to rotate with the shaft and coacting with a complementary stationary ring 36 secured to the housing 30.

The inner end of the input shaft 28 is keyed to a drive sleeve 38 encircling the shaft 28 and defining an annular series of external drive teeth 40 that mesh with an internal annular series of comating teeth 42 on a coupling sleeve 44 encircling the drive sleeve 38 as shown. An annular lip or flange 48 on the outer end of the coupling sleeve 44 extends radially inward toward the drive sleeve 38 to form a rotary dam 48 for retaining lubricating oil as will presently appear, the annular lip or dam 48 stopping radially short of the drive sleeve 38 to provide an annular opening 50 therebetween for the entry of a jet of lubricating fluid as will be described.

Figure 5:
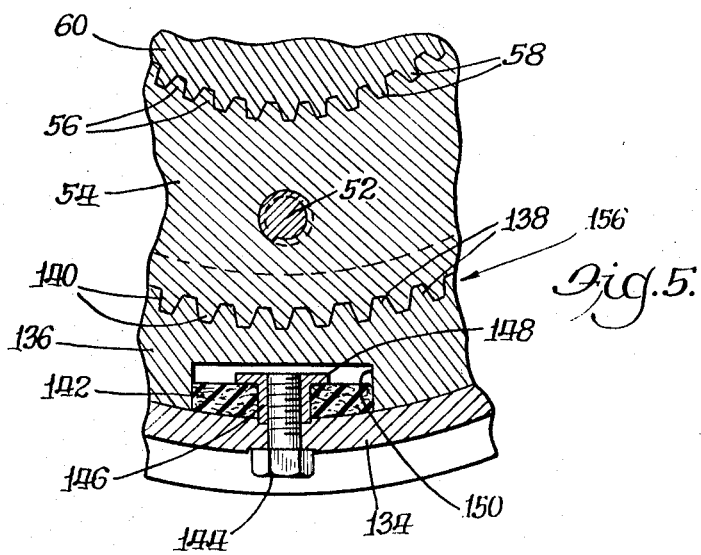
FIG. 5 is a fragmentary sectional view on an enlarged scale taken with reference to the line 5—5 in FIG. 3.

The opposite end of the coupling sleeve 44 is flared radially outward and is secured by capscrews or bolts 52 to a ring 54 separately fabricated but functioning as a part of the coupling sleeve 44. The inner periphery of the coupling sleeve ring 54 defines an internal annular series of of teeth 56 that mesh continuously with a comating annular series of external teeth 58 formed on the radially enlarged adjacent end of an inner intermediate drive sleeve 60, thus establishing an axially slidable continuous driving connection between the coupling sleeve 44 and the inner intermediate drive sleeve 60, FIGS. 3 and 5. The intermediate drive sleeve 60 extends away from the input shaft 28 as shown and is keyed to an encircling inner race or cam 62 of a one-way drive coupling or clutch denoted generally by the number 64, FIGS. 3 and 5. The inner race 62 is held firmly against the enlarged end of the sleeve 60 defining the teeth 58 by a circular disc 63 secured to the opposite end of the sleeve 60 by screws 65.

The inner clutch race 62 is encircled by an outer race 66 of the clutch 64, which outer race is embraced between two rings 68, 70 held against the respective radial faces or axial ends of the race 66 by a plurality of capscrews or bolts 72, as shown in FIG. 3. Annular ledges 74, 76 on the respective rings 68, 70 engage comating annular ledges on the outer clutch race 66 to assure retention of the race and rings in mutually concentric relation to each other, the outer race 66 and rings 68, 70 together constituting an outer intermediate drive sleeve denoted generally by the number 77. Such outer intermediate sleeve 77 is journaled in mutually concentric relation to the inner intermediate drive sleeve 60 and the inner clutch race 62 by means of two antifriction bearings, in this instance ball bearings 78, 80, encircling opposite ends of the inner clutch race 62 in supporting relation to adjacent encircling portions of the outer intermediate sleeve 77, suitable shoulders being provided on the inner race 62 and outer intermediate sleeve 77 to assure retention of the outer sleeve 77 and hence the outer clutch race 66 in a predetermined axial position in relation to the inner clutch race 62.

Having reference to FIGS. 3 and 4, the inner clutch race 62 defines an annular series of circumferentially extending ramps 82 inclined in a common direction toward an opposing cylindrical surface 84 formed on the inner periphery of the outer clutch race 66 in radially spaced relation to the ramps 82. An annular series of cylindrical thrust-transmitting elements or rollers 86 are disposed between the respective ramps 82 and the encircling race surface 84. The rollers 86 are maintained in uniformly spaced relation to each other and biased toward the high ends of the respective ramps 82 by a coacting annular cage 88 with the consequence that rotation of the inner race 62 in a counterclockwise direction relative to the outer race 66, with respect to FIG. 4, is continuously precluded by wedging of all the rollers 86 between the respective ramps 82 and the encircling race surface 84. As a consequence, torque can be transmitted through the torque-transmitting elements or rollers 86 in one direction between the inner race 62 and the outer race 66. All the while, the inner race 62 and the parts rotatable with the inner race 62 are free to rotate with reference to FIG. 4 in a clockwise direction in relation to the outer race 66, the torque-transmitting elements or rollers 86 being displaced down the respective ramps 82 sufficiently to allow essentially free relative rotation of the inner race 62 in the clockwise direction in relation to the outer race 66.

The outer intermediate drive sleeve 77 is connected by an annular series of capscrews 90 with a radially enlarged flange 92 on the adjacent end of a coupling sleeve 94 encircling a drive sleeve 96 and defining an annular series of internal teeth 98 meshing with an annular series of external teeth 100 on the drive sleeve 96 to form an axially slidable torque-transmitting connection between the coupling sleeve 94 and the drive sleeve 96. The drive sleeve 96 is adapted to encircle and be keyed to an output shaft 102, FIG. 3, connecting with the speed-reduction gearing 16 as illustrated schematically in FIG. 1.

The shaft 102 extends through the housing 30, an effective rotary seal between the shaft and housing being formed by a sealing collar 104 supported on the shaft 102 and forming a capillary seal with a comating stationary ring 106 mounted on the housing.

An annular flange or lip 108 formed on the outer end of the coupling sleeve 94 extends radially toward the drive sleeve 96 just outboard of the teeth 100, stopping radially short of the drive sleeve 96 to define an annular opening 110 into the inter space between the sleeve through which a jet of oil is directed for lubrication of working parts as will be presently described.

As will be referred to again in greater detail, the propeller shaft 14 can be driven in the forward direction by the main engine 18 turning the input shaft 28, FIG. 3, in the forward direction and operating through the drive sleeve 38, coupling sleeve 44, intermediate sleeve 60, one-way clutch or coupling 64, outer intermediate sleeve 77, coupling sleeve 94 and drive sleeve 96 to turn the connecting shaft 102 in the forward direction while continuously permitting overdriving of the connecting shaft 102 in the forward direction by the auxiliary engine 20, thus allowing the propeller shaft 14 to be energized by the auxiliary engine 20 alone without the auxiliary engine suffering any drag from the main engine.

Rotation of the propeller shaft 14 in the reverse direction by the main engine is provided by a positive clutch integrated with the previously described construction of FIGS. 1, 3, 4 and 5 as will now appear.

An annular series of external teeth 112 formed on the ring 68, constituting a component of the outer intermediate sleeve 77, meshes continuously with an annular series of internal teeth 114 formed on a first positive clutch ring 116 and being elongated axially to permit a rather extensive lateral or axial movement of the clutch ring 116 while maintaining the internal teeth 114 in continuous torque-transmitting engagement with the external teeth 112.

The first clutch ring 116, FIG. 3, is connected by an annular series of capscrews 118 with an annular shifter ring 120 formed in two annular segments 122, 124 connected together by an annular series of capscrews 126 and defining a circular shifter ring groove 128 opening radially outward to receive a plurality of circumferentially spaced shifter rollers 130 journaled on a control ring 132 encircling the groove 128. As will be described, controlled displacement of the ring 132 operates through the rollers 130 accommodated in the groove 128 to selectively displace the annular shifter ring 120 between two operating positions.

It is noteworthy at this juncture that the annular shifter ring 120 extends radially inward of the tooth defining outer periphery of the adjacent ring 68 and provides an annular dam which aids in assuring continuous lubrication of the positive clutch being described.

An annular extension 134 on the outer periphery of the first positive clutch ring 116 extends axially in the direction of the coupling sleeve 44 and slidably encircles a second annular positive clutch ring 136 defining an annular series of internal teeth 138 adapted to move slidably in an axial direction into and out of meshing engagement with an annular series of external teeth 140 formed on the outer periphery of the annular ring 54 constituting a component of the coupling sleeve 44. A series of circumferentially spaced resilient torque-transmitting discs 142 formed of rubber or other suitable elastomeric or yieldable polymeric material are secured to the cylindrical inner periphery of the axial extension 134 of the first positive clutch ring 116, as shown in FIG. 3, by a plurality of capscrews 144 extending through the extension 134 into threaded engagement with support bushings 146 fitted centrally within the respective discs 142 and having on their inner ends radial flanges 148 overlapping and supporting the inner faces of the corresponding discs as shown.

The torque-transmitting resilient discs 142 thus supported for rotation with the first positive clutch ring 116 fit into a corresponding series of circumferentially spaced openings 150 in the outer periphery of the second positive clutch ring 136 to transmit torque between the first positive clutch ring 116 and the second positive clutch ring 136 while allowing limited circumferential displacement of the two rings relative to each other, such displacement being cushioned by the resiliency of the discs 142 which tend continuously to maintain a predetermined circumferential alignment of the rings relative to each other.

An annular retaining ring 152 secured to the first clutch ring extension 134 by a circumferential series of capscrews 154 engages the adjacent side of the second clutch ring 136 to hold the latter in slidable radial engagement with the first positive clutch ring 116. The inner periphery of the retaining ring 152 extends radially inward somewhat beyond the radial disposition of the positive clutch teeth 112, 114, 138 and 140 to provide an annular dam for lubricant that is caused to pool radially outward in lubricating engagement with the coacting clutch parts as will be described.

Controlled engagement and disengagement of the positive clutch formed of the components just described and denoted generally in FIG. 3 by the number 156 are effected by an integrated electrical and hydraulic control circuit to be described which includes two double-acting hydraulic control cylinders 158 (only one of which is shown in FIG. 3) connected to the operating ring 132 to shift the latter axially between a first position shown in solid lines in FIG. 3 which effects engagement of the positive clutch 156 and a second position illustrated in phantom lines in FIG. 3 in which the positive clutch 156 is disengaged. The axially shiftable positive clutch components including the two clutch rings 116, 136 and the shifter ring 120 are held releasably in their engaged positions by engagement of an internal annular groove 162 in the inner periphery of the shifter ring 120 with spring-biased detent balls 160 supported in the outer intermediate drive sleeve 77. Similarly, the groove 162 receives a second plurality of spring-biased detent balls 164 in the drive sleeve 77 to retain the axially shiftable positive clutch parts in their positions wherein the positive clutch is disengaged.

Meshing of the teeth 138 with the teeth 140 to engage the positive clutch 156 upon shifting movement of the clutch ring 136 to the left, with reference to FIG. 3, by the fluid cylinders 158 is cushioned by the resilient discs 142 to the end that clashing and shock on the clutch parts moving into engagement is minimized to the extent that it is of no practical consequence.

As an incident to its operation to engage and disengage the positive clutch 156, the hydraulic control cylinder 158 shown in FIG. 3 operates through a connecting linkage 166 to actuate a limit switch assembly 168 as an incident to engagement and disengagement of the positive clutch, the limit switch assembly being interconnected with the integrated electrical and hydraulic control system for the clutch in a manner to be described.

It should be observed at this point that the working parts of the drive unit supported by and including the two drive couplings 38, 96 mounted on the respective shafts 28, 102 are formed largely of annular components, which by reason of their generally circular shape are inherently well suited for economical manufacture.

Also, it should be appreciated at this point that the structural relationship of the parts provides a most effective and assured lubrication of mutually engaged working surfaces of the working parts. Jets of lubricating liquid are continuously directed into the annular openings 50, 110 into opposite ends of the assembly from adjacent nozzle elements 170, 172, FIG. 3, mounted on the inside of the housing 30 and supplied with liquid under pressure in a manner to be described.

Liquid directed from the nozzles 170, 172 through the annular openings 50, 110 enters the internal space within the unit where it is centrifuged outwardly, during operation of the unit, into flooding relation to working surfaces on the working parts, the liquid being retained against spillage from the space into which it enters through the openings 50, 110 by the previously described annular lips or dams 48, 108 which extend radially inward beyond the radial location of the working surfaces on the working parts as illustrated. The lubricant flows axially inward to lubricate the clutch 64, the mutually engaged teeth on the working parts, the liquid being centrifuged radially outward to flood the coacting teeth of the positive clutch 156, the annular retainer 152 serving as previously described to retain an annular pool of such lubricant centrifuged into flooding relation to the positive clutch 156.

At this point, it should be noted that a small radial port 174 in the annular segment 122 of the shifter ring 120 bleeds lubricant into the groove 128 to lubricate the rollers 130, the annular segment 124 of the shifter ring 120 extending radially inward beyond the annular segment 122 sufficiently to dam up an annular pool of lubricant around the inner surface of the ring segment 122 which the liquid reaches by flowing past the mutually engaged clutch teeth 112, 114. An oil groove 175 formed in the inner periphery of ring 70 extends past the bearing 80, FIG. 3, to carry oil to the clutch 64.

Figure 6:
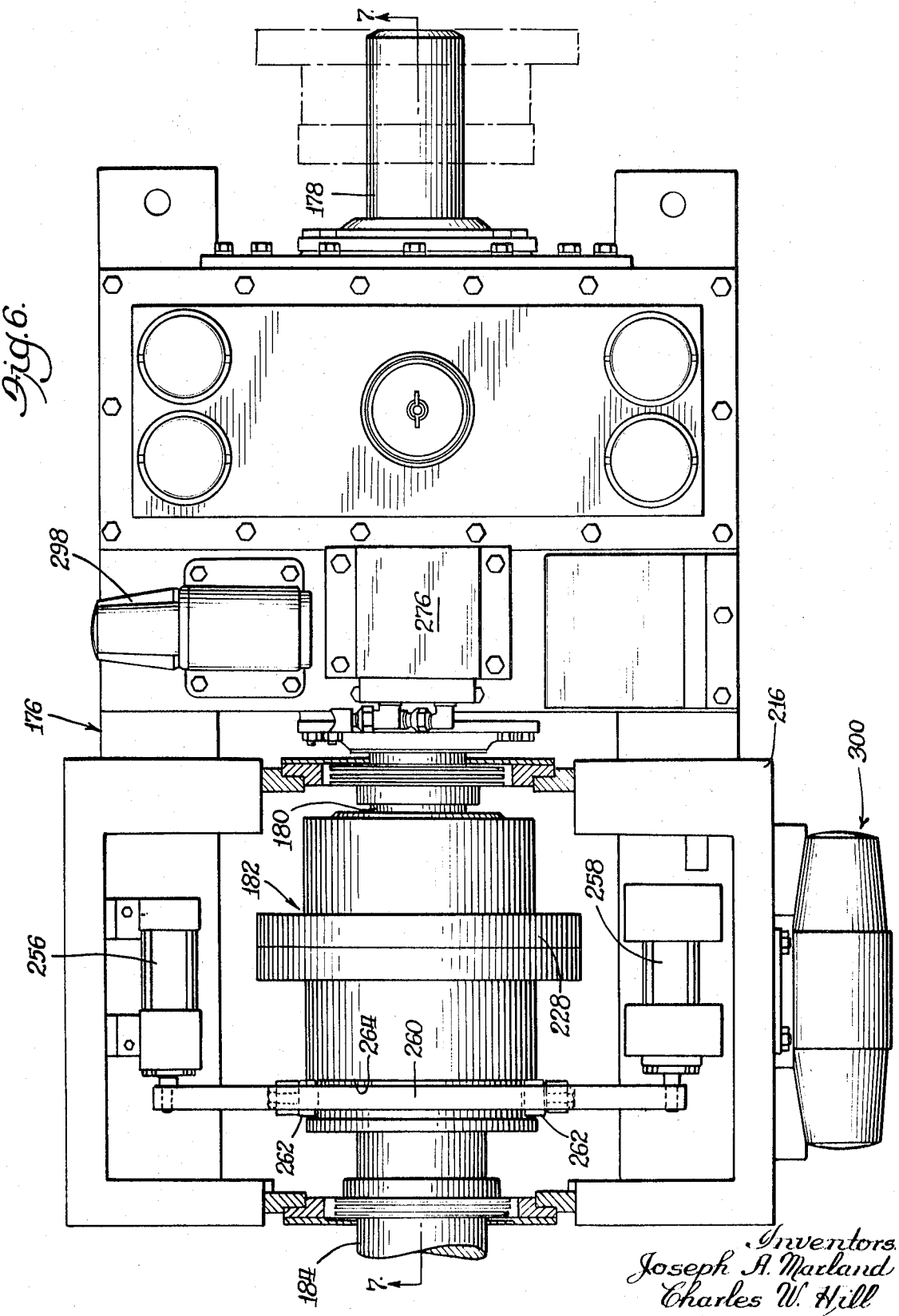
FIG. 6 is a general plan view, with certain parts broken away for clearness in illustration of the drive between the auxiliary engine and the speed-reduction gearing of FIG. 1.
Figure 7:
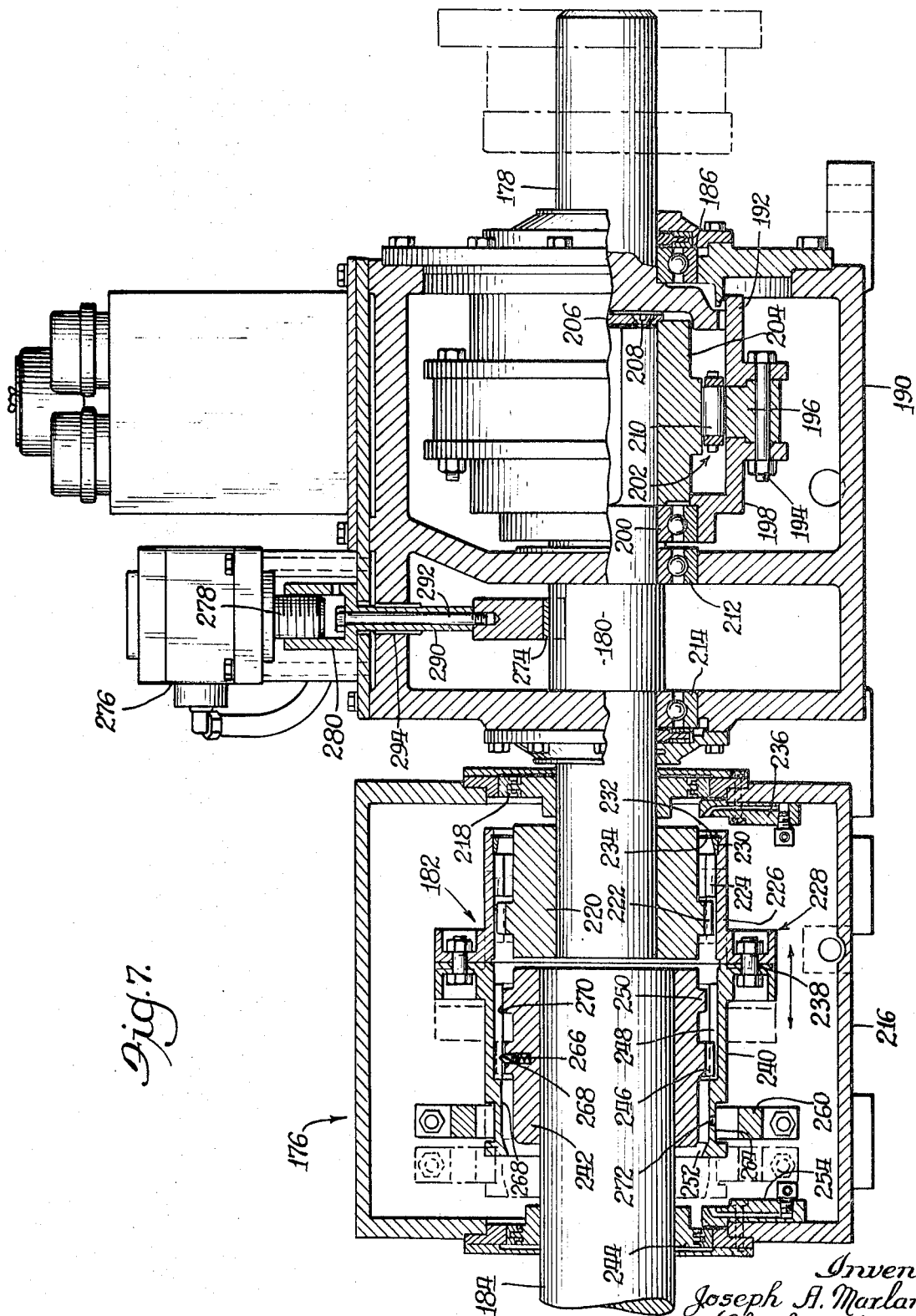
FIG. 7 is a longitudinal sectional view taken with reference to the line 7—7 of FIG. 6.

The auxiliary engine also drives the propeller shaft 14 forwardly through a transmission unit 176, FIGS. 1, 6 and 7, which functions in conjunction with the transmission unit 26, FIGS. 1, 3, 4 and 5, to enable the two engines 18, 20 to work together in driving the propeller shaft forwardly while automatically allowing either engine to assume the full load of driving the shaft forwardly without suffering drag from the other engine.

As shown in greater detail in FIGS. 6 and 7, the transmission unit 176 comprises an output shaft element 178 connected to the speed-reduction gearing 16 and driven in a forward direction by an intermediate power shaft 180 selectively connected, as will presently appear, by a positive clutch 182 with an input drive shaft 184 from the auxiliary engine 20.

The output shaft 178 is journaled by an antifriction bearing 186 in a housing 190 and has a radially enlarged inner end including a flanged hollow cylindrical component 192 secured by an annular series of bolts 194 to one side of an outer clutch race 196, the opposite side of the annular race 196 being secured by the same bolts 194 to an annular support element 198 journaled on the adjacent end of the intermediate drive shaft 180 by an antifriction bearing 200.

The outer clutch race 196 constitutes a component of a one-way drive clutch 202 having a general construction and mode of operation similar to the previously described one-way clutch 64 incorporated into the transmission unit 26. The one-way clutch 202 includes an inner annular race 204 keyed to the adjacent end of the intermediate shaft 180 and held axially in encircling relation to the shaft 180 by a circular retaining plate 206 secured by screws 208 threaded into the shaft 180.

A plurality of torque-transmitting rollers 210 forming components of the one-way clutch 202 function in the clutch to transmit torque from the shaft 180 to the output shaft 178 in the direction corresponding to forward rotation of the propeller shaft 14, while at the same time leaving the output shaft 178 free to overrun rotatably in a forward direction relative to the intermediate shaft 180.

The intermediate shaft 180 is journaled in the housing 190 by two axially spaced antifriction bearings 212, 214 and cantilevers rotatably into an adjacent casing or housing 216 of the transmission unit 176. The cantilevering end of the intermediate shaft 180 enters the housing 216 through coacting circular components 218 forming a capillary seal. Inside the housing 216, the shaft 180 supports an encircling positive clutch sleeve 220 forming a component of the positive clutch 182 and defining an annular series of external teeth 222 adapted to mesh with an annular series of internal clutch teeth 224 formed within a first end segment 226 of an axially shiftable clutch sleeve denoted generally by the number 228. An annular lubricant-retaining ring 230 is held within the outer end of the sleeve segment 226 by a snap ring 232 and extends toward the sleeve 220 to define with the sleeve an annular opening 234 through which a jet of lubricating liquid is sprayed from an adjacent nozzle 236 mounted on the inner wall of the housing 216 as shown in FIG. 7.

The inner end of the sleeve segment 226 is flared radially outward and attached by an annular series of bolts 238 to a similarly flanged adjacent end of a second segment 240 of the coupling sleeve 228 encircling a drive sleeve 242, which in turn encircles the adjacent end of the input shaft 184 cantilevering into the housing 216 through a labyrinth-sealing assembly 244. The drive sleeve 242 is keyed or otherwise secured to the input shaft 184 for forced rotation with the shaft 184. An annular series of external teeth 246 formed medially on the drive sleeve 242 meshes with an annular series of internal teeth 248 formed on the coupling sleeve segment 240. The coupling teeth 248 are elongated axially a sufficient distance to allow axial shifting movement of the coupling sleeve 228 while maintaining continuous engagement of the teeth 248 with the driving teeth 246.

An external annular protuberance 250 formed on the inner end of the sleeve 242 engages adjacent end portions of the teeth 248 to radially support the coupling sleeve 228 when the latter is in its clutch-disengaged position illustrated in solid lines in FIG. 7. When the coupling sleeve 228 is shifted to the left with reference to FIG. 7 to engage the clutch 182 as will be described, radial support for the right-hand end of the sleeve 228 is provided by the teeth 222 on the driven sleeve 220.

The outer end of the clutch sleeve segment 240 is shaped to extend toward the adjacent end of the drive sleeve 242 stopping short of the drive sleeve to define therebetween an annular opening 252 through which a jet of liquid from a nozzle 254 on the housing 216 is directed to lubricate internal working parts.

The clutch sleeve 228 is shifted axially between the position shown in solid lines in FIG. 7 in which the clutch 182 is disengaged and the position illustrated in phantom in FIG. 7 in which the clutch 182 is engaged by two double-acting hydraulic control cylinders 256, 258, FIG. 6, connected with a shifter ring 260 encircling the outer end of the coupling sleeve segment 240 and supporting a plurality of rollers 262, FIG. 6, rotatable about radial axes and extending into an annular actuator groove 264 formed in the adjacent end of the sleeve segment 240.

The clutch-coupling sleeve 228 is yieldably held in either of its two operating positions described by an outwardly biased detent 266 supported in the drive sleeve 242 and releasably engaging either of two axially spaced recesses 268, 270 in the sleeve 228.

It may be noted at this juncture that lubricating liquid jetted through the annular openings 234 and 252 from the adjacent nozzles 236, 254 flows axially inward and is centrifuged radially outward to continuously flood working surfaces of working parts, the centrifuged fluid being dammed against axial spillage by the annular ring 230 in one end of the sleeve 228 and by the inwardly extending opposite end of the sleeve 228 as described. One or more bleed apertures 272, FIG. 6, bleeds liquid outwardly into the groove 264 to lubricate the shifter wheels 262 and rolling engagement of the same wheels with sidewalls of the groove 264.

When the propeller shaft 14 is to be driven by the main engine 18 in the reverse direction, the actuating cylinders 258 are energized to shift the coupling sleeve 228 to the right with reference to FIG. 7, disengaging the clutch 182 by slipping the teeth 224 axially out of engagement with the teeth 222 thus releasing the output shaft 178 and the intermediate shaft 180 to be driven in the reverse direction free of the input shaft 184 and without reversing the auxiliary engine 20.

Moreover, the clutch 182 may be left disengaged for an indefinite period of time if desired when the auxiliary engine 20 is not running, even when the main engine 18 is being used to drive the propeller shaft 14 in a forward direction. When the propeller shaft 14 and when the output shaft 178, FIG. 7, are being driven forwardly by the main engine 18 with the clutch 182 disengaged, the intermediate shaft 180 may rotatably idle or freewheel somewhat in a corresponding forward direction, due to a practical negligible resistance of the one-way clutch 202 to freewheeling which is, nevertheless, functionally adequate to cause the intermediate shaft 180 to idle in the forward direction on account of the low friction of the bearings 214, 212 journaling the shaft 180.

Under these conditions, it may be desirable to reengage the clutch 182 to condition the auxiliary engine 20 to either wholly or partially drive the propeller shaft 14. Under such conditions, the clutch 182 is engaged by shifting the sleeve 228 to the left with reference to FIG. 7 engaging the teeth 224 with the teeth 222, this engagement of the coacting teeth being effected without clashing or shock to the parts by virtue of a momentary, preliminary stopping of the intermediate shaft 180 by means of a brief engagement of an arcuate brake element 274 with a segment of the intermediate shaft 180 extending between the bearings 212, 214 within the housing 190.

The brake 274 is moved into and out of engagement with the shaft 180 by a rotary hydraulic motor 276 externally mounted on the housing 190 and having a rotary output shaft 278 coacting with the internally threaded, enlarged outer end 280 of a brake-actuating plunger 290 attached to the brake 274 by an internal, axial bolt 292. The axially movable plunger 290 extends, as shown, into the housing 190 and is held against rotation by coacting splines 294 on the housing and plunger so that rotation of the shaft 278 of the brake control motor 276 effects translation of the brake 274 either into or out of engagement with the shaft 180.

The transmission 22, FIG. 1, is controlled by an integrated electrical and hydraulic control circuit illustrated schematically in FIG. 2 and coacting with the previously described transmission structure depicted in FIGS. 3 through 7 in such manner that disengagement of the auxiliary engine 20 is assured when the main engine 18 is connected to drive the propeller shaft 14 in reverse and disabling of the main engine 18 to drive the propeller shaft 14 in reverse is assured when a connection between the auxiliary engine 20 and propeller shaft 14 is reestablished for driving the propeller shaft 14 forwardly by the cumulative power of both engines or the output of either engine.

Having reference to FIG. 2, a supply line 296 containing hydraulic fluid under pressure is connected to a solenoid-operated control valve 298 for the hydraulic control motor 276 which actuates the brake 274 for momentarily stopping the intermediate shaft 180 within the transmission unit 176. The control fluid line 296 is also connected to a solenoid-operated control valve 300 for the two hydraulic control cylinders 256, 258, FIGS. 2 and 6, for actuating the shifter ring 260 of the positive clutch 182 of the transmission unit 176.

As previously indicated, the transmission 22 is integrated in such manner that the auxiliary engine is made effective to drive the propeller shaft 14 forwardly either by its own power alone or by the cumulative power of both engines only when the main engine 18 is rendered ineffective for driving the propeller shaft 14 in the reverse direction. Bearing this in mind and having reference now to the exemplary construction illustrated diagrammatically in FIG. 2, it will be noted that an input conductor 302 of electrical control power is connected to a control power conductor 304 through an intervening switch 306 forming a component of the previously mentioned switch assembly 168, FIG. 3, integrated with the transmission unit 26 in a manner to be described which provides for energization of the input control conductor 304 only when the positive clutch 156 of the unit 26 is disengaged thereby rendering the main engine 18 incapable of driving the propeller shaft 14 in reverse.

To envision the mode of operation of the interlocked controls, it may be helpful first to assume that the main engine 18 has been used to drive the propeller shaft 14 in reverse and that the positive clutch 156, FIG. 3, of the transmission unit 26 has now been disengaged in preparation for use of either or both engines to drive the propeller shaft forwardly, the positive clutch 182 of the transmission unit 176 at this juncture still being in its disengaged condition it had during the preceding usage of the main engine 18 to drive the propeller shaft in reverse. As intimated, disengagement of the positive clutch 156 of the transmission unit 26 energizes the input power conductor 304 making the control switch 308 effective to controllably produce a momentary stoppage of the freewheeling intermediate shaft 180 of the unit 176 followed automatically by engagement of the positive clutch 182 to render the auxiliary engine 20 effective for driving the propeller shaft 14 forwardly. The control switch 308 is closed and held closed until reconnection of the auxiliary engine 20 to the shaft 14 is completed as will be described, the switch 308 being held closed manually or in the alternative by suitable time-delay-retaining means (not shown) of a conventional construction that may be used for this purpose.

Closure of the switch 308 energizes a memory switch 310, which may be envisioned generally as a normally closed relay switch and operates through the memory switch 310 to energize the solenoid-operated control valve 298 to direct hydraulic operating fluid from the line 296 through the valve 298, in the direction opposite from that illustrated in FIG. 2, to the brake control motor 276 causing the motor 276 to engage the brake 274 with the idling intermediate shaft 180 bringing the shaft 180 to a stop, as previously described, as a prelude to engagement of the clutch 182. The memory switch 310, simultaneously with energizing the solenoid control valve 298, energizes a time-delay switch 312. The time-delay switch goes into operation and after lapse of a period of time predetermined to be sufficient to allow momentary stoppage of the shaft 180 by the brake 274 functions to trigger the memory switch 310 to deenergize the control valve 298 and to direct control power to an "AND" switch 314 to which energizing power has been previously supplied through a conductor 316 upon closure of the control switch 308.

The "AND" switch 314, which can be visualized as a relay switch, then energizes a second memory switch 318 that can be visualized as being a normally closed relay switch.

The output of the energized switch 318 operates the solenoid valve 300, shifting the internal valve control element 302 of the valve 300 to the right with reference to FIG. 2 to energize both control cylinders 256, 258, FIG. 6, to actuate the shifter ring 260 and engage the positive clutch 182 thus connecting the input shaft 184, FIGS. 6 and 7, with the intermediate shaft 180. It should be noted at this point that deenergization of the solenoid control valve 298, which also ensues in response to operation of the time-delay switch 312, allows the valve 298 to return to its neutral position illustrated in FIG. 2, reversing the direction of fluid pressure on the control motor 276 which pulls the brake 274 away from the intermediate shaft 180 as the shaft 180 is positively connected to the input shaft 184 with the ensuing engagement of the positive clutch 182.

Movement of the shifter ring 260 into its position which effects a complete engagement of the positive clutch 182 is accompanied by a mechanical closing of limit switch 320, previously energized through the memory switch 318 and connected back to the memory switch 318 through the conductor 322 to effect upon closure of the switch 320 operation of the memory switch 318 to deenergize the solenoid-operated control valve 300, which immediately returns to its neutral position illustrated in FIG. 2 in which the valve 300 connects both sides of both hydraulic control cylinders 256, 258 to drain, the clutch 182 being held in its closed position by engagement of the detent 266 with the recess 270, FIG. 7, as previously described.

With the positive clutch 182 of the transmission unit 176 engaged and the positive clutch 156 of the transmission unit 26 engaged, either engine 18, 20 is effective to drive the propeller shaft 14 forwardly as described. In the event it is desired to drive the propeller shaft 14 in reverse using the main engine 18, it is necessary, before engaging the positive clutch 156 of the unit 26, to first disengage the positive clutch 182 of the unit 176 so that the auxiliary engine 20 is not driven in reverse, this being effected by closure of a second control switch 324, FIG. 2, which is held closed by hand or suitable time-delay means provided for this purpose (not shown) until the clutch 182 is disengaged.

Closure of the control switch 324 sends power from the energizing power conductor 304 to a memory switch 326, which can be visualized a a normally closed relay switch, that energizes the solenoid-operated control valve 300 to shift the control element 302 of the valve 300 to the left with reference to FIG. 2 thereby energizing the cylinders 256, 258, FIG. 6, to move the shifter ring 260 to the right, disengaging the positive clutch 182. Movement of the shifter ring 260 to its clutch-disengaging position is attended by closing of a limit switch 328 to connect an output conductor 330 from the memory switch 326 to a control conductor 332 for the switch 326, thus effecting opening of the switch 326 and deenergization of the solenoid valve 300 with the consequence that the valve returns to its neutral condition depicted in FIG. 2 draining again fluid pressure from both control cylinders 256, 258 leaving the positive clutch 182 in its disengaged position in which it is held by engagement of the detent 266 with the recess 268.

Disengagement of the positive clutch 182 is also accompanied by closure of a limit switch 334 connecting the power conductor 302 with two control switches 336, 338 for the positive clutch 156.

To engage the positive clutch 156 for driving the propeller shaft 14 in reverse after the auxiliary engine 20 has been disconnected thereby closing the limit switch 334, the control switch 336 is closed and directs power through closed limit switch 340 to a solenoid-operated control valve 342 shifting an internal control element 344 of the valve 342 to the right with reference to FIG. 2 thereby connecting a supply line 348 of hydraulic operating fluid to the control cylinders 158, FIGS. 2 and 3, to displace the shifter ring 132 to the left with reference to FIGS. 2 and 3 to engage the positive clutch 156. As the positive clutch 156 is engaged, the limit switch 340, included as a part of the switch assembly 168, opens to deenergize the control valve 342, allowing the valve control element 344 to return to its neutral position of FIG. 2 to release pressure from both control cylinders 158, the clutch 156 then being held in its engaged position by coaction of the annular groove 160, FIG. 3, with the detent balls 162.

It should be noted with reference to FIG. 2 that in the construction illustrated the interlocking switch 305 forming a part of the limit switch assembly 168 is opened as an incident to engagement of the positive clutch 156, thereby deenergizing the control conductor 304 so that the other clutch 182 cannot be engaged by reason of deenergization of the control switch 308 and also the control switch 324 previously described.

With the positive clutch 156 engaged and the positive clutch 182 disengaged, which is a prerequisite to engagement of clutch 156, the propeller shaft 14 can be driven in reverse by the main engine 18 through the reverse gearing 24.

When driving of the propeller shaft 14 in reverse is not contemplated, the positive clutch 156 can be disengaged by closing control switch 338 which operates through closed limit switch 348 to energize the solenoid control valve 342 to shift the valve control element 344 to the left with respect to FIG. 2, to energize the control cylinders 158 to disengage the positive clutch 156 as described. As disengagement of the clutch 156 is completed, the previously closed limit switch 348 incorporated in the limit switch assembly 168 is opened to deenergize the control valve 342 which returns to its neutral position shown in FIG. 2 to spill fluid pressure from both operating cylinders 158 leaving the clutch 156 in its open position where it is held by coaction of the annular groove 160 with the detent balls 164, FIG. 3.

Also as an incident to disengagement of the clutch 156, the previously open limit switch 306 in the assembly 168 is closed to reenergize the control conductor 304 so that the control switches 308, 324 are again effective to engage and disengage the positive clutch 182.

It will be noted with reference to FIG. 2 that the operating fluid supply line 296 is connected to the nozzles 254, 236 to supply the liquid that is jetted into the clutch 182 to lubricate the latter as described and the fluid supply line 346 is connected to the nozzles 170, 172 to supply the fluid that is jetted into the annular apertures 150, 110 to lubricate the unit 26 as described.

The invention is claimed as follows:

1. A transmission comprising a first transmission unit connectable in tandem between two coaxial drive shafts to transmit torque therebetween selectively in one direction only or in either direction and comprising a first rotary coupling element, means for connecting said fist coupling element to one drive shaft, a second rotary coupling element, means for connecting said second coupling element to the other drive shaft, a one-way clutch continuously connected between said first and second coupling elements to transmit torque therebetween in one direction while allowing torque in the opposite direction to turn said coupling elements relative to each other, a first annular series of torque transmitting elements fixed on one of said coupling elements to rotate therewith, a positive clutch element axially slidable with reference to said coupling elements and defining a second annular series of torque-transmitting elements continuously engaging said first series of torque-transmitting elements in torque-transmitting relation thereto, the other of said coupling elements having an annular series of positive clutch surfaces thereon, said positive clutch element having means thereon defining an annular series of positive clutch surfaces movable into and out of clutching engagement with the positive clutch surfaces on said other coupling element as an incident to axial shifting movement of the positive clutch element, and a control coacting with said positive clutch element to axially move the latter between a first position for clutching said positive clutch element and said other coupling element together for transmitting torque in either direction between said first and second coupling elements and a second position for declutching said positive clutch element from said first coupling element to allow free rotation of said first and second coupling elements in one direction relative to each other as determined by said one-way clutch; and a second transmission unit connectable in tandem between an input power shaft and an output power shaft rotatable in unison with one of said drive shafts, said second transmission unit comprising a rotary drive sleeve adapted to be connected to the input power shaft to receive torque therefrom, a rotary power element connectable to the output power shaft, and intermediate drive shaft disposed in intervening coaxial relation to said drive sleeve and said power element, a first annular clutch race connected with said intermediate drive shaft for rotation therewith, a second annular clutch race connected with said power element for rotation therewith in coaxial relation to said first clutch race, one of said races defining an annular series of circumferentially extending ramps inclined toward the other race, an annular series of thrust-transmitting elements corresponding to said respective ramps and disposed between said respective ramps and the other race to transmit torque between the races in one direction while leaving said races and said intermediate drive shaft and said power element connected with the respective races continuously free to rotate relative to each other in a direction opposite from said one direction, a brake coacting with said intermediate drive shaft, a power actuator coacting with said brake to move the latter into and out of braking relation with said intermediate drive shaft to selectively stop free rotation of the latter, means on said intermediate drive shaft defining a first annular series of external teeth, means on said drive sleeve defining a second of annular series of external teeth, an axially shiftable clutch sleeve positioned to encircle said first and second annular series of teeth, control means coacting with said clutch sleeve for shifting the latter axially between a driving position and an idle position, said clutch sleeve having internal teeth meshing continuously with the teeth of one of said series when the coupling sleeve is in both said positions thereof, and said clutch sleeve having internal teeth meshing with the teeth of the other of said series only when said coupling sleeve is in said driving position thereof whereby said drive sleeve and said intermediate drive shaft are disconnected for rotation relative to each other when said coupling sleeve is in said idle position thereof and said drive sleeve and said intermediate shaft are coupled for rotation together in torque-transmitting relation to each other when said coupling sleeve is in said driving position thereof.

2. A transmission comprising a first transmission unit connectable in tandem between two coaxial drive shafts to transmit torque therebetween selectively in one direction only or in either direction and comprising a first rotary coupling element, means for connecting said first coupling element to one drive shaft, a second rotary coupling element, means for connecting said second coupling element to the other drive shaft, a one-way clutch continuously connected between said first and second coupling elements to transmit torque therebetween in one direction while allowing torque in the opposite direction to turn said coupling elements relative to each other, a first annular series of torque-transmitting elements fixed on one of said coupling elements to rotate therewith, a positive clutch element axially slidable with reference to said coupling elements and defining a second annular series of torque-transmitting elements continuously engaging said first series of torque-transmitting elements in torque-transmitting relation thereto, the other of said coupling elements having an annular series of positive clutch surfaces thereon, said positive clutch element having means thereon defining an annular series of positive clutch surfaces movable into and out of clutching engagement with the positive clutch surfaces on said other coupling element as an incident to axial shifting movement of the positive clutch element, and a control coacting with said positive clutch element to axially move the latter between a first position for clutching said positive clutch element and said other coupling element together for transmitting torque in either direction between said first and second coupling elements and a second position for declutching said positive clutch element from said first coupling element to allow free rotation of said first and second coupling elements in one direction relative to each other as determined by said one-way clutch; and a second transmission unit connectable in tandem between an input power shaft and an output power shaft rotatable in unison with one of said drive shafts, said second transmission unit comprising a rotary input element adapted to be connected to the input power shaft to receive torque therefrom, a rotary output power element connectable to the output power shaft, an intermediate drive shaft disposed in intervening coaxial relation to said input power element and said output power element, a first clutch race connected with said intermediate drive shaft for rotation therewith, a second clutch race connected with said output power element for rotation therewith, thrust-transmitting means coacting with said races to transmit torque therebetween in one direction while leaving the races and said intermediate drive shaft and said output power element connected with the respective races continuously free to rotate relative to each other in a direction opposite from said one direction, a brake coacting with said intermediate drive shaft, a power actuator coacting with said brake to apply the latter selectively to stop free rotation of the intermediate drive shaft, a positive clutch connected to both said input power element and said intermediate drive shaft, and control means coacting with said positive clutch to engage and disengage the latter selectively to declutch and to clutch together said input power element and said intermediate shaft.

3. A marine transmission for driving a propeller shaft forwardly by either or both of two engines and selectively in reverse by one engine and comprising a first output shaft connectable continuously with a propeller shaft, a first drive shaft connectable with a first engine, a first positive clutch connectable to said first drive shaft, a first one-way clutch connectable to said first output shaft, an intermediate shaft connecting said first positive clutch with said first one-way clutch, a brake coacting with said intermediate shaft, a hydraulic brake actuator coacting with said brake to engage the latter with said intermediate shaft, a brake control valve connected in controlling relation to said brake actuator, a first hydraulic clutch actuator coacting with said first positive clutch to engage and disengage the latter, a first clutch control valve connected in controlling relation to said first hydraulic clutch actuator, a first electrical control connected in controlling relation to said brake control valve to energize the latter to operate said brake to stop rotation of said intermediate drive shaft, a timer coupled to said first electrical control and coacting with said brake control valve and said first clutch control valve to effect at a predetermined time subsequent to operation of said first electrical control release of said intermediate shaft by said brake and operation of said first hydraulic clutch actuator to engage said first positive clutch, limit switch means interconnected with said first positive clutch and coupled with said first clutch control valve to restore the latter to normal position as an incident to engagement of said first positive clutch, a second electrical control coupled with said first clutch control valve to operate the latter to disengage said first positive clutch, limit switch means interconnected with said first positive clutch and coacting with said second electrical control to restore said first clutch control valve to normal position as an incident to disengagement of said first positive clutch, a second output shaft connectable with the propeller shaft, a second drive shaft connectable with a second engine, a second one-way clutch continuously connected between said second drive shaft and said second output shaft, a second positive clutch continuously connected between said second drive shaft and said second output shaft in parallel with said second one-way clutch, a second hydraulic clutch actuator coacting with said second positive clutch for engaging and disengaging the latter, a second clutch control valve connected to control said second clutch actuator, a third electrical control connected with said second clutch control valve to operate the latter selectively to effect engagement and disengagement of said second positive clutch, and synchronizing circuit means interconnected with said first positive clutch and with said second positive clutch for inhibiting operation of said first and second electrical controls when said second positive clutch is engaged and inhibiting operation of said third electrical control when said first positive clutch is engaged.

4. A marine transmission for driving a propeller shaft forwardly by either or both of two engines and selectively in reverse by one engine and comprising a first output shaft connectable continuously with a propeller shaft, a first drive shaft connectable with a first engine, a first positive clutch connectable to said first drive shaft, a first one-way clutch connectable to said first output shaft, an intermediate shaft connecting said first positive clutch with said first one-way clutch, a brake coacting with said intermediate shaft, a power brake actuator coacting with said brake to apply the latter to brake rotation of said intermediate shaft, a brake control connected in controlling relation to said brake actuator, a first powered clutch actuator coacting with said first positive clutch to engage and disengage the latter, a first clutch control connected in controlling relation to said first powered clutch actuator, a first electrical control connected in controlling relation to said brake control to operate the latter to apply said brake to stop rotation of said intermediate shaft, a timer coupled to said first electrical control and coacting with said brake control and said first clutch control to effect at a predetermined time subsequent to operation of said first electrical control release of said brake and operation of said first clutch actuator to engage said first positive clutch, a second electrical control coupled with said first clutch actuator to operate the latter to disengage said first positive clutch, a second output shaft connectable with the propeller shaft, a second drive shaft connectable with a second engine, a second one-way clutch continuously connected between said second drive shaft and said second output shaft, a second positive clutch continuously connected between said second drive shaft and said second output shaft in parallel with said second one-way clutch, a second powered clutch actuator coacting with said second positive clutch for engaging and disengaging the latter, a third electrical control coupled with said second clutch actuator to effect engagement and disengagement of said second positive clutch, and synchronizing circuit means interconnected with said first positive clutch and with said second positive clutch for inhibiting operation of said first and second electrical controls when said second positive clutch is engaged and inhibiting operation of said third electrical control when said first positive clutch is engaged.

* * * * *

PO-1050
(5/69)

UNITED STATES PATENT OFFICE
CERTIFICATE OF CORRECTION

Patent No. 3,618,719      Dated November 9, 1971

Inventor(s) Joseph A. Marland and Charles W. Hill

It is certified that error appears in the above-identified patent and that said Letters Patent are hereby corrected as shown below:

Column 9, line 60 (actual count) after visualized delete "a" and insert --as--

Column 10, line 23, "305" should be --306--

Column 10, line 64 (actual count) "fist" should be --first--

Signed and sealed this 4th day of July 1972.

(SEAL)
Attest:

EDWARD M. FLETCHER, JR.
Attesting Officer

ROBERT GOTTSCHALK
Commissioner of Patents